March 29, 1949.    N. S. FOCHT    2,465,680
HYDRAULIC SHOCK ABSORBER
Filed Nov. 29, 1946    3 Sheets-Sheet 1
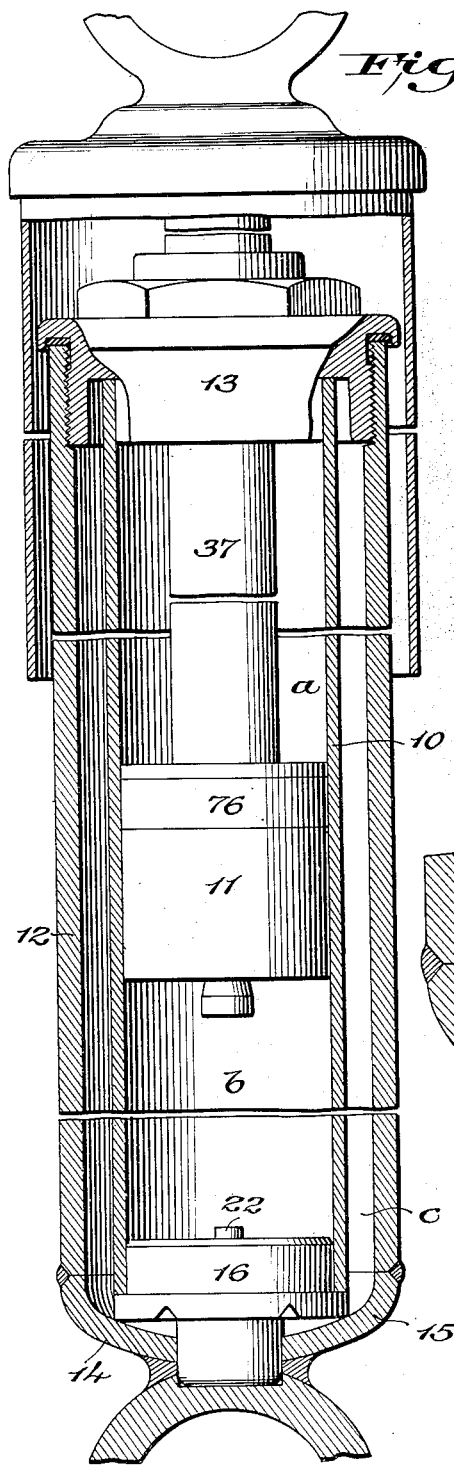
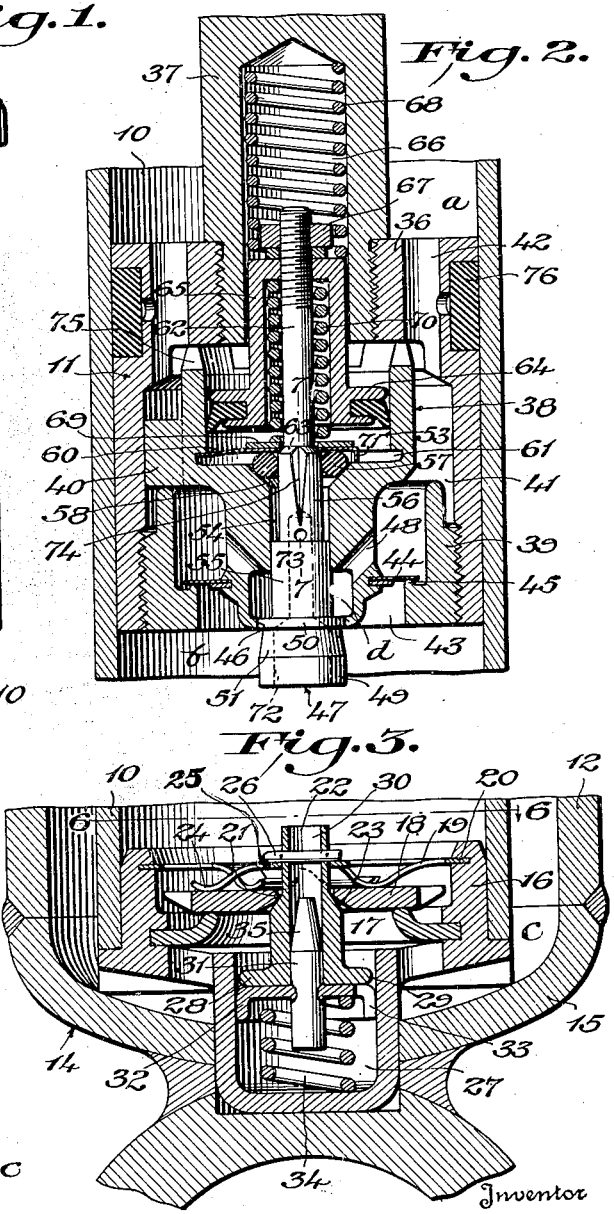
Inventor
Nevin S. Focht,
By
Attorney March 29, 1949.　　　　N. S. FOCHT　　　　2,465,680
HYDRAULIC SHOCK ABSORBER
Filed Nov. 29, 1946　　　　　　　　　　　　3 Sheets-Sheet 2
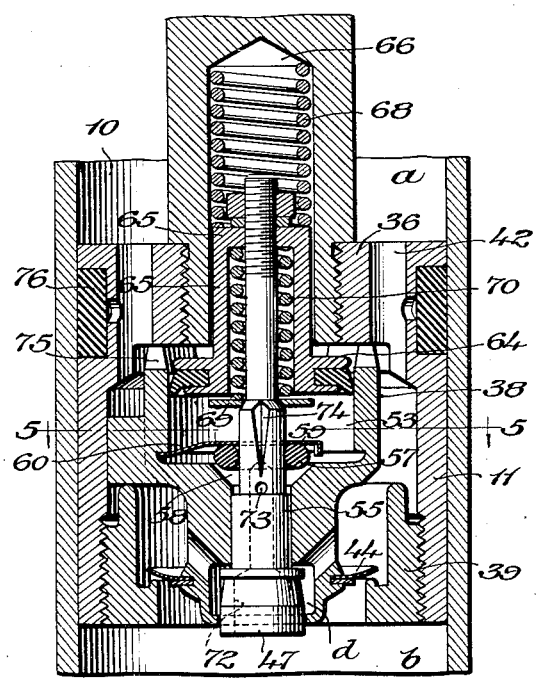
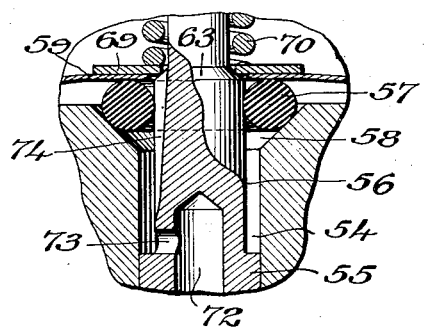
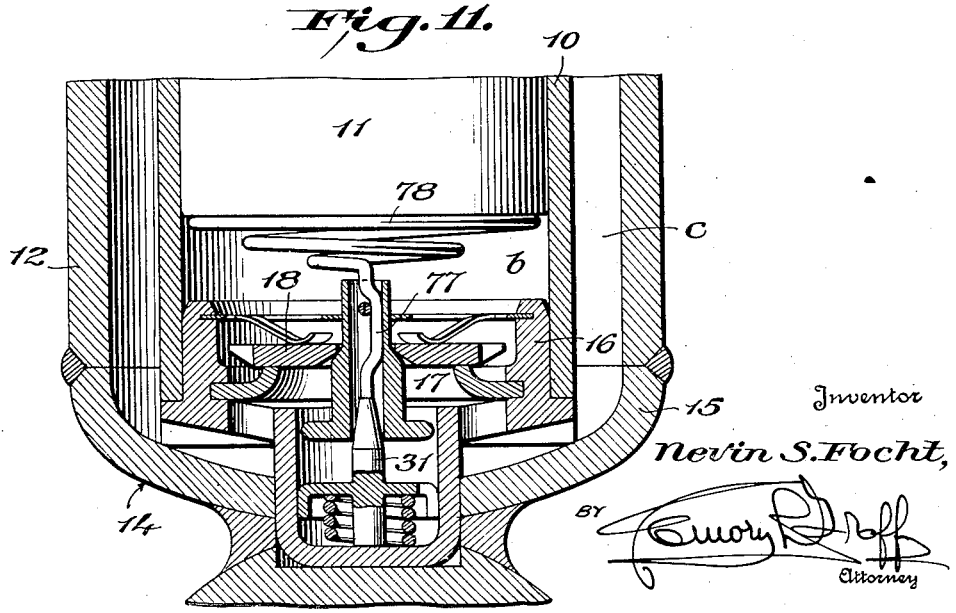
Inventor
Nevin S. Focht, March 29, 1949.  N. S. FOCHT  2,465,680
HYDRAULIC SHOCK ABSORBER
Filed Nov. 29, 1946  3 Sheets-Sheet 3
Fig. 5.
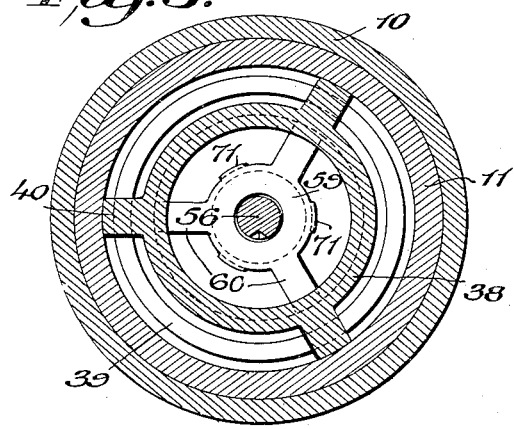
Fig. 6.
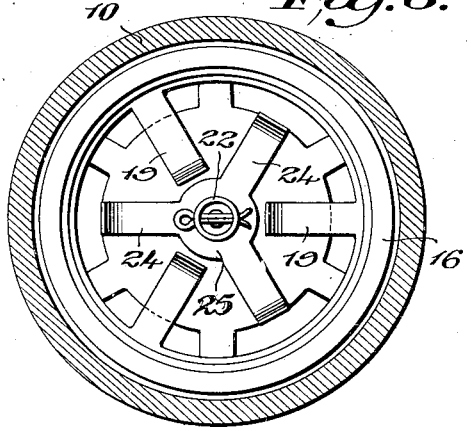
Fig. 8.
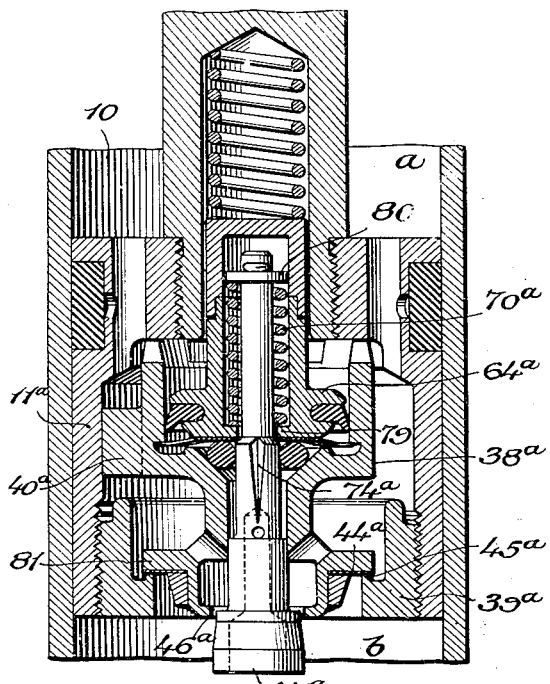
Fig. 10.
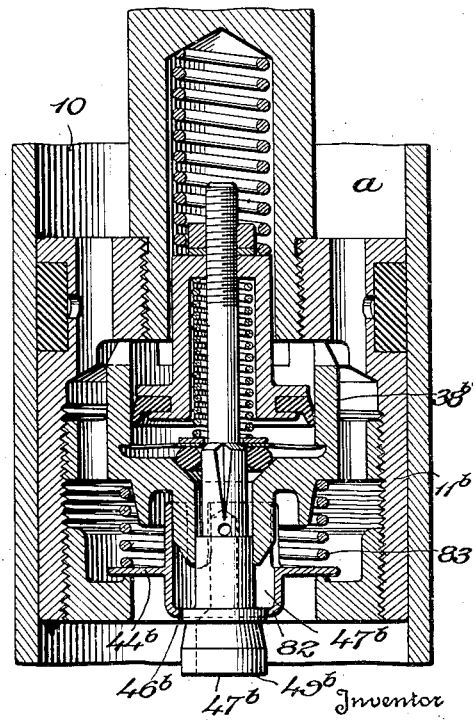
Fig. 9.
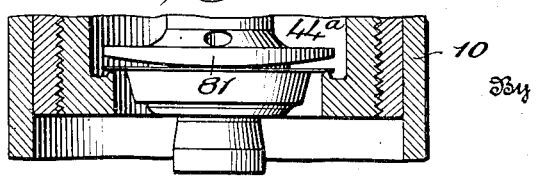
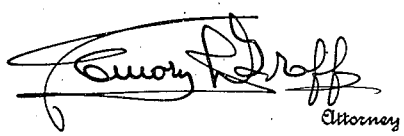
Inventor
Nevin S. Focht,
By
Attorney Patented Mar. 29, 1949

2,465,680

UNITED STATES PATENT OFFICE 2,465,680

HYDRAULIC SHOCK ABSORBER

Nevin S. Focht, Syracuse, N. Y.

Application November 29, 1946, Serial No. 712,935

5 Claims. (Cl. 188—88)

This invention relates to shock absorbers, and has particular reference to improvements in hydraulic shock absorbers of the cylinder and piston or strut type as described and claimed, for example, in my prior Patents Nos. 2,144,583, 2,240,644, 2,342,729, 2,403,648 and 2,409,349.

Assuming use of the present shock absorber between the body and an axle of a vehicle wherein the body is yieldably supported upon the axle through the instrumentality of springs, one special and important object of the present invention is to provide improved valve means for so controlling flow of liquid through the piston of the shock absorber as to cause the shock absorber effectively to snub rebound action of the vehicle springs following their above normal compression, and yet to permit the shock absorber to distend substantially freely from its normal position to allow the vehicle wheels to drop substantially freely into roadway holes, all to the end of imparting smooth riding qualities to the vehicle.

According to the present invention, the piston of the shock absorber is provided with a metering pin to regulate flow of liquid through the piston for the purpose of snubbing rebound action of the vehicle springs following compression shocks imparted to the shock absorber and said springs. The metering pin is actuated to a "set" position by the compression shock, and is movable from its "set" position during the rebound phase of operation of the shock absorber to regulate flow of the liquid so as properly to snub the rebound action, and in this connection, another special and important object of the present invention is to provide simple, practical means directly actuated by the flow and the pressure of the liquid produced as a result of the compression shock to actuate the metering pin to its starting or "set" position, whereby the rebound control is precisely proportional to the compression shock from which the rebound action emanates.

The present shock absorber includes a liquid reservoir and metering pin means operable normally by pressure of the liquid in the shock absorber generated by compression shocks imposed upon the shock absorber to regulate flow of liquid from the cylinder of the shock absorber to said reservoir for the purpose of snubbing or absorbing the compression shocks. If a vehicle upon which the shock absorber is used is well sprung and its body is substantially fully loaded, or overloaded, it will tend easily to "bottom" in the absence of some means to actuate the metering pin means positively in a manner to control flow of the liquid to prevent the "bottoming."

Accordingly, another special and important object of the present invention is to provide simple, practical means operable upon the final portion of compression movement of the shock absorber to positively actuate said metering pin means to control flow of liquid from the cylinder to the reservoir in a manner to prevent said "bottoming."

With the foregoing and other objects in view, which will become more fully apparent as the nature of the invention is better understood, the same consists in a hydraulic shock absorber of the type mentioned embodying the novel features of construction, combination and arrangement of parts as will be hereinafter more fully described, illustrated in the accompanying drawings, and defined in the appended claims.

In the accompanying drawings, wherein like characters of reference denote corresponding parts in related views:

Figure 1 is a central, longitudinal section through a shock absorber constructed in accordance with one practical embodiment of the invention.

Figure 2 is an enlarged central, longitudinal section through the piston thereof showing the piston valve elements in their normal positions.

Figure 3 is an enlarged central, longitudinal section through the valve means for controlling flow of liquid between the cylinder and the reservoir of the shock absorber.

Figure 4 is a view similar to Fig. 1 showing the piston valve elements in positions as produced by a compression shock imposed upon the shock absorber.

Figure 5 is a cross section on the line 5—5 of Fig. 4.

Figure 6 is a cross section on the line 6—6 of Fig. 3.

Figure 7 is an enlarged section on the line 7—7 of Fig. 2.

Figure 8 is a view similar to Fig. 2 illustrating an alternative form of the piston valve means.

Figure 9 is a fragmentary section through and at right angles to the Fig. 8 structure.

Figure 10 is a view similar to Figs. 2 and 8 illustrating another alternative form of the piston valve means; and Figure 11 is a view similar to Fig. 3 illustrating positive actuating means for the metering pin means which controls flow of liquid from the cylinder to the reservoir of the shock absorber.

Referring to the drawings in detail, it will be observed that the present shock absorber is of the cylinder and piston or strut type descrbed in my aforementioned prior patents and includes a cylinder 10 and a piston 11 for connection with any desired pair of relatively movable elements such, for example, as the axle and the chassis or body of a motor vehicle.

While the present shock absorber may be disposed for operation either vertically or horizontally or at any desired inclination, it will be assumed, for purposes of simplifying the present description, that it is disposed vertically with its cylinder 10 and its piston 11 connected to the axle and the chassis or body, respectively, of a vehicle of the type in which the body is yieldably supported upon the axle by suitable springs.

Concentric with and surrounding the cylinder 10 in spaced relationship thereto is a tube 12, while closing the upper and the lower ends of said cylinder and tube and holding them in their spaced apart relationship, are upper and lower heads 13 and 14, respectively. These heads may be of any suitable construction and may be mounted in closing relationship to the ends of the cylinder 10 and the tube 12 in any suitable manner. For example, the lower head 14 may comprise a main body portion 15 welded, threaded or otherwise suitably fastened to the lower end of the tube 12, and a separate plug element 16 superimposed upon said main body portion and having the lower end of the cylinder 10 seated thereon, while the upper head 13 may be of like construction or may consist of only a single element welded, threaded or otherwise suitably fastened to the upper end of the tube 12 and suitably engaged with the upper end of the cylinder 10. In any event, the piston 11 divides the cylinder 10 into upper and lower pressure chambers designated as $a$ and $b$, respectively, while the space between the cylinder 10 and the tube 12 constitutes a liquid reservoir designated as $c$.

In the plug element 16 is a central port 17 which affords communication between the reservoir $c$ and the pressure chamber $b$ for flow of liquid from said reservoir to said pressure chamber under the control of a check valve 18 in the form of a disk which opens upwardly and closes downwardly upon a seat surrounding said port 17. Suitable spring means such, for example, as spring fingers 19 projecting inwardly from a ring 20 mounted in the upper part of the plug element 16 and engaged with the top of the check valve 18, tend constantly to urge said valve downwardly upon its seat to close the port 17.

Formed centrally through the check valve disk 18 is a port 21 which affords communication between the pressure chamber $b$ and the reservoir $c$ under the control of a metering pin 22 which extends through said port and is provided with an upwardly facing, preferably upwardly tapered shoulder 23 for cooperation with a seat surrounding said port. Said port is opened by downward movement of said metering pin relative to the disk 18 and said metering pin constantly is urged upwardly toward a position closing said port by suitable spring means such, for example, as spring fingers 24 which are engaged with the top of the disk 18 and which project outwardly from a ring 25 disposed beneath a pin 26 extending through said metering pin.

Formed preferably as an integral part of the plug 16 is an open-top well 27 which is disposed beneath the port 17 and which is in communication at its top with the reservoir $c$. On the lower end of the metering pin 22 is a piston formation 28 which is disposed within said well whereby a dash-pot is afforded to cushion, retard, and smooth out downward movements of said metering pin. The piston formation 28 is of slightly lesser diameter than the internal diameter of the well 27 to afford a clearance space 29 for restricted flow of liquid from the well space beneath said piston formation to and through the open top of said well.

In the metering pin 22 is an axial bore 30 in the lower end portion of which is disposed a flow control valve in the form of pin 31 which, like said metering pin 22, is provided with a piston formation 32 disposed within the well 27 to afford a dash-pot to cushion, retard and smooth out downward movements thereof.

In the piston formation 32 may be one or more narrow slits 33 for restricted flow of liquid from the well space beneath said piston formation to the well space thereabove, or, if desired, said piston formation 32 may be of slightly lesser diameter than the internal diameter of the well 27 for this purpose.

Suitable spring means such, for example, as a helical spring 34 interposed between the bottom of the well 27 and the piston formation 32, is provided to urge the flow control valve 31 constantly upwardly.

The flow control valve 31 is downwardly movable relative to the metering pin 22 under certain conditions by pressure of liquid generated in the pressure chamber $b$ acting upon its upper end, and its upper end portion is upwardly tapered as indicated at 35 so that as it moves downwardly through the lower end of the metering pin 22 it provides for progressively increased flow of liquid from the pressure chamber $b$ downwardly through the bore 30 of the metering pin 22 to the well space beneath the piston formation 28 of said metering pin 22.

At the top of the piston 11 is a wall 36 having therein a central bore in which is threaded the lower end portion of a piston rod 37 which extends from said piston upwardly through the pressure chamber $a$ and through the upper head 13 for connection in any suitable manner with, for example, the chassis or body of a vehicle.

Any suitable means may be provided for connecting the tube 12 with, for example, the axle of a vehicle. It thus will be apparent that road conditions which produce compression shocks; i. e., which cause the vehicle axle and body to approach each other and compress the vehicle springs, will result in relative inward movement of the cylinder 10 and the piston 11, while conditions which cause the vehicle body and its axle to move apart will result in relative outward movement of the cylinder 10 and the piston 11.

Referring more particularly to the piston structure illustrated in Figs. 2, 4, 5 and 7 of the drawings, it will be observed that the piston 11 is hollow below its top wall 36 and has disposed therein a valve body 38 which is clamped between the wall 36 and a valve seat ring 39 which is threaded into the lower end portion of said piston.

The valve body 38 is of lesser diameter than the internal diameter of the portion of the piston 11 in which it is disposed and may be held centered or coaxial with said piston in any suitable manner, as, for example, by means of exterior lugs 40 thereon engaging the interior face of said piston. In any event, there is a space 41 between said valve body and the side wall of the piston 11 and there are holes 42 in the piston top wall 36 through which said space 41 is in constant communication with the pressure chamber a. Moreover, said space 41 is in one-way communication with the pressure chamber b through a large central port 43 in the valve seat ring 39 under the control of an upwardly opening, downwardly closing check valve 44 cooperating with a seat 45 surrounding said port 43, and in opposite-way communication with said pressure chamber b through a port 46 in the lower end of the valve body 38 under the control of a metering pin 47.

The check valve 44 may be of any suitable type and is illustrated as comprising a marginally free, flexible ring mounted at its inner edge upon the lower portion of the valve body 38.

The port 46 opens into a chamber d in the lower end portion of the valve body 38 and this chamber is in communication, above the check valve 44, with the space 41 through ducts 48 in the said lower end portion of said valve body.

The metering pin 47 is disposed coaxially with respect to the piston 11 and its lower end portion is in the form of a head 49 including an upper cylindrical portion 50 of substantially the same diameter as the port 46, and a portion 51 directly therebelow of progressively decreasing diameter upwardly, both for cooperation with said port 46 in which said head is disposed.

In the upper portion of the valve body 38 is a dash-pot well 53, while in the intermediate portion of said valve body is an axial bore 54 which extends between the top of the chamber d and the bottom of said dash-pot well.

Directly above its head 49 the metering pin 47 includes a portion 55 which neatly fits the bore 54, while above said portion 55 said metering pin includes a portion 56 of reduced diameter which extends through and neatly fits a check valve ring 57 of rubber-like material which preferably is of circular cross section.

The ring 57 seats downwardly upon a preferably downwardly tapering seat 58 at the upper end of the bore 54 and is retained normally in engagement with said seat by suitable spring means such, for example, as a ring 59 overlying said ring 57 and having spring fingers 60 projecting therefrom into a groove 61 in the side wall of the dash-pot well 53.

Above its portion 56 the metering pin 47 is in the form of a stem 62 of smaller diameter than said portion 56 whereby an upwardly facing shoulder 63 is formed at the junction of said stem with said portion 56.

In the dash-pot well 53 is a plunger 64 which includes a guide portion 65 extending upwardly into a bore 66 in the lower end of the piston rod 37. The guide portion 65 is of closed-top, open bottom, hollow form and the stem portion 62 of the metering pin 47 extends upwardly therethrough and has threaded connection therewith at its top, whereby the spaced relationship between the head 49 of said metering pin and the dash-pot plunger 64 may be varied. A locknut 67 threaded on the upper end of the stem portion 62 for cooperation with the top of the guide portion 65 affords a means of maintaining any desired threaded adjustment between the metering pin 47 and the dash-pot plunger 64.

Between the top of the guide portion 65 of the dash-pot plunger 64 and the top of the bore 66 in the piston rod 37 is interposed an expansion helical spring 68 which tends constantly to urge the dash-pot plunger 64 and the metering pin 47 downwardly, while between the closed top of said guide portion 65 and a ring 69 which normally is seated upon the ring 59, is interposed a somewhat lighter helical expansion spring 70 which acts through said rings 69 and 59 to normally urge the check valve ring 57 downwardly upon its seat 58. Suitable means preferably is provided to prevent over-compression of the check valve ring 57 by the springs 68 and 70, this means comprising, for example, downturned fingers 71 on the ring 59 engageable with the bottom wall of the dash-pot cylinder 53.

In the lower portion of the metering pin 47 is a longitudinal bore 72 which opens through the bottom of said metering pin and which, at or near its top, is in communication with the bore 54 in the valve body 38 through a lateral hole 73 in said metering pin adjacent to the bottom of its reduced portion 56, while in the outer face of said reduced portion 56 and extending from the upper end thereof downwardly to a point near said hole 73 is a liquid metering groove 74 of progressively decreasing cross sectional area downwardly.

In the top of the valve body 38 are suitable openings 75 through which the dash-pot cylinder 53, above the plunger 64, is in communication with the openings 42 and hence with the upper pressure chamber a.

A packing ring 76 surrounds the piston 11 and operates in accordance the teachings of my aforesaid patents to prevent leakage of liquid around the outside of said piston between the pressure chambers a and b.

Under normal conditions the piston 11 is disposed approximately midway between the ends of the cylinder 10 and the piston parts have relative positions substantially as shown in Fig. 2 of the drawings. That is to say, the plunger 64 and the metering pin 47 are in their lowermost positions; the upper cylindrical portion 50 of the head 49 of said metering pin is disposed in the part 46; the check valve ring 57 is seated upon its seat 58; the upper portion of greatest cross sectional area of the groove 74 of the metering pin 47 is disposed in the central horizontal plane or portion of least internal diameter of said check valve ring 57, and the check valve 44 is closed.

Also under normal conditions, the check valve disk 18 is closed; the metering pin 22 is in its uppermost position closing the central port 21 in said check valve disk, and the metering pin 31 is in its uppermost position with the cylindrical portion thereof below its tapered upper end 35 disposed in the bore 30 of the metering pin 22.

Both of the pressure chambers a and b as well as the various spaces in the piston 11 and the lower head 14 are charged with liquid and a suitable reserve quantity of liquid is contained in the reservoir c.

As in the case of my prior patents referred to, the present shock absorber has four distinct phases of operation; viz., (1) "compression above normal," as when an obstruction in a roadway is encountered and the vehicle spring is compressed with consequent inward movement of the cylinder 10 and the piston 11 relative to each other from their normal positions; (2) "rebound above normal," or relative outward movement of the cylinder 10 and the piston 11 from their "compression above normal" status; (3) "rebound below normal," as when a depression in a roadway is encountered and the vehicle spring is distended with consequent outward movement of the cylinder 10 and the piston 11 relative to each other from their normal positions; and (4) "compression below normal" or relative inward movement of the cylinder 10 and the piston 11 from their "rebound below normal" relative positions.

As an obstruction in a roadway is encountered and the "compression above normal" phase of operation takes place with consequent inward movement of the cylinder 10 and the piston 11 relative to each other, the liquid in the pressure chamber *b* is subjected to increasing pressure with the result that the piston check valve 44 is opened and the pressure partly is relieved by flow of some of the liquid from the lower pressure chamber *b* through the piston to the upper pressure chamber *a*. Since, however, due to the presence of the piston rod 37 in the upper pressure chamber *a*, said upper pressure chamber cannot accommodate all of the liquid which seeks to escape from the lower pressure chamber *b*, the consequent rising pressure in the lower pressure chamber *b* acts on the upper ends of the metering pins 22 and 31 and forces them downwardly as a unit, with the result that the port 21 in the check valve disk 18 is opened for flow of liquid from the pressure chamber *b* to the reservoir *c*.

It will be understood, of course, that the present shock absorber may be of different sizes or capacities for use in connection with different vehicles or other spring suspensions. In this connection, the average spring will in itself function satisfactorily to absorb all minor compression shocks to which it may be subjected. In other words, for shocks which produce compression of a spring not exceeding approximately the initial one-half part of its total compressive movement, it is unnecessary and, in fact, even undesirable to materially snub the spring action. Accordingly, in any given installation of the present shock absorber, the effective area of the port 21 and the strength of the spring 24 are such as to permit the necessary discharge of liquid from the pressure chamber *b* to the reservoir *c* so that the shock absorber does not act materially to resist compression of the vehicle spring within approximately the initial one-half portion of its compressive movement. The metering pin 22 readily opens to permit discharge of the liquid because the relatively low pressure and velocity of the liquid does not cause said metering pin to move downwardly so rapidly as to cause the liquid beneath the disks 28 to choke the clearance space 29 in escaping from the dash-pot well 27 consequent upon downward movement of said disk 28 into said well.

If, however, the shock is of such severity as to cause the vehicle spring to be compressed beyond approximately the initial one-half portion of its total compressive movement, the increased liquid pressure generated in the pressure chamber *b* causes the flow control pin 31 to move downwardly relative to the metering pin 22 until the tapered upper end 35 of said flow control pin extends more or less below the bottom of said metering pin, depending upon the pressure generated. Liquid then flows from the pressure chamber *b* downwardly through the bore 30 of the metering pin 22 beneath the disk 28 of said metering pin and, because of its velocity, more or less chokes the clearance space 29. Because of the greater area of the disk 28, upon which the pressure of the liquid acts upwardly, than of the portion of the metering pin 22 upon which the pressure of the liquid acts downwardly, said metering pin is forced upwardly and thereby decreases the effective area of the port 21. As a result, flow of liquid from the pressure chamber *b* through said port 21 is retarded and thereby the pressure in the chamber *b* is caused to rise with consequent increase in the compression resistance of the shock absorber.

Because the flow control pin 31 is itself dash-potted and thereby acts to cause flow of the liquid beneath the disk 28 to be of substantially constant volume value consistent with the amplitude of compression of the vehicle spring, increase in compression resistance of the shock absorber beyond the desired value and as might result from too rapid downward movement of said flow control pin in any given instance, is effectively avoided.

Obviously, since the dash-pot well 27 is charged by the very action which is to be controlled, there can never be an absence of instantaneous control regardless of the speed of the action. Moreover, the control is highly advantageously, directly proportional to the action.

During the "compression above normal" phase of operation of the shock absorber, the pressure generated in the compression chamber *b* results in flow of liquid from said pressure chamber upwardly through the bore 72 and the hole 73 in the metering pin 47 into the bore 54 of the valve body 38 beneath the check valve ring 57. As a result, said check valve ring is lifted from its seat and liquid is admitted to the dash-pot cylinder 53 beneath the plunger 64, thereby causing said plunger and the metering pin 47 to be more or less raised, depending upon the pressure generated, until the tapered portion 52 of the head of said metering pin is disposed in or above the port 46 and the lower constricted portion of the groove 74 of said pin is disposed in the central, horizontal plane of the check valve ring 57, all as shown by way of example in Fig. 4 of the drawings.

As the "rebound above normal" phase of operation of the shock absorber occurs following its described "compression above normal" phase of operation, with consequent outward movement of the cylinder 10 and the piston 11 relative to each other, the liquid in the chamber *a* is subjected to pressure, the check valve 44 and the check valve ring 57 become seated and the pressure of the liquid acting downwardly upon the plunger 64 and the metering pin 47 assisted by the force of the spring 68, cause said metering pin to move downwardly at a rate governed on the one hand by the rebound pressure generated and, on the other hand, by the effective area of the groove 74 through which liquid from the dash-pot cylinder 53 passes in its return flow to the pressure chamber *b*.

The effective area of the port 46 is, of course, relatively small at the moment of initiation of the "rebound above normal" phase of operation, but increases as the metering pin 47 moves downwardly. Downward or return movement of the metering pin 47 is governed by the groove 74 through which liquid escapes from the dash-pot cylinder 53 in its return flow to the pressure chamber *b* and is maintained at a substantially constant rate because of increase in the effective cross sectional area of the groove 74 as the pressure in the chamber *b* decreases. The portion 51 of the metering pin head permits increased flow of liquid from the pressure chamber *a* to the pressure chamber *b* as the pressure in the pressure chamber *a* decreases and may be designed to permit such flow at a rate to afford most desirable snubbing or checking of the rebound action. Obviously, since the metering pin 47 is raised to a "set" position by the action which stores the rebound energy in the vehicle spring, control of the rebound in proportion to the energy to be snubbed or checked is assured.

Since, due to the presence of the piston rod 37 in the pressure chamber a, not enough liquid is delivered from said chamber to the chamber b to maintain the latter chamber filled during outward movement of the cylinder 10 and the piston 11 relative to each other, the additional liquid required to maintain said chamber b filled is drawn from the reservoir c through the port 17.

Since the degree of rebound control is governed by the amount of charging the dash-pot well 53 receives, over-control on higher frequency, low amplitude "washboard" roads are avoided due to the hole 73 being of such small size as not to admit liquid in sufficient quantities to said dash-pot cylinder to appreciably charge the same within the brief periods of time during which any such charging might otherwise occur. Therefore, the main control port 46 will not be reduced in effective area to the point where a "bound down harsh ride" might result. On the other hand, on low frequency pitching, where there are longer periods of time for flow of liquid through the hole 73 into the dash-pot cylinder 53 and consequent raising of the metering pin 47, the effective area of the main control port 46 will be reduced considerably with the result of effectively damping out the pitching.

The "rebound below normal" phase of operation of the shock absorber occurs when, for example, a vehicle wheel encounters a hole in a roadway. Upon such an occurrence, the vehicle spring is distended and the cylinder 10 and the piston 11 are moved outwardly relative to each other from their normal relative positions. Pressure thereby is generated in the upper compression chamber a and acts downwardly upon the plunger 64. The spring 70 yields readily under comparatively low pressure generated in the pressure chamber a and acting downwardly upon the plunger 64, and in the normal position of the metering pin 47 the effective cross sectional area of the groove 74 is comparatively large so that free flow of liquid from the dash-pot well 53 below the plunger 64 is permitted. Consequently, under comparatively low pressure generated in the pressure chamber a, the metering pin 47 is moved downwardly the necessary small amount to move the portion 50 of the head of said metering pin out of the port 46. Opening of said port 46 permits dumping of liquid from the pressure chamber a into the pressure chamber b and as a consequence the vehicle wheel is permitted to drop substantially freely into the hole in the roadway without disturbing the equilibrium of the vehicle body.

The "compression below normal" phase of operation of the shock absorber occurs following the "rebound below normal" phase of operation as the vehicle wheel rides out of a hole in a roadway and equilibrium is sought to be established between the energy exerted by the vehicle body downwardly against the force of the vehicle spring exerted upwardly. The loss of energy of the vehicle spring during the "rebound below normal" phase of operation of the shock absorber and needed to establish a condition of equilibrium, is supplied by the resistance to inward movement of the cylinder 10 and the piston 11 relative to each other as heretofore explained in connection with the "compression above normal" phase of operation of the shock absorber.

With a well sprung vehicle substantially fully loaded, or overloaded, "bottoming" will tend to occur in some instances under conditions which produce the "compression above normal" phase of operation of the shock above. To avoid this, means may be provided to insure positive downward movement of the flow control valve 31 a sufficient amount at a time sufficiently in advance of the "bottoming" to permit sufficient liquid to flow through the metering pin 22 beneath the disk 28 thereof to urge said metering pin upwardly the necessary amount to sufficiently check the flow through the part 21 to prevent the said "bottoming." Such means may comprise any suitable member movable downwardly by the piston 11 and effective at the proper time upon downward movement thereof to positively move the flow control valve 31 to tis limit of downward movement as determined by any suitable stop means such, for example, as the bottom of the well 27 with which the bottom of said valve is engageable. In the present instance said means is illustrated in Fig. 11 of the drawings as comprising a pin 77 engaged at its bottom with the top of the flow control valve 31 and extending upwardly into the cylinder 10 for engagement and downward movement by the piston 11 upon the occurrence of a certain amount of inward movement of such piston relative to the cylinder 10. Preferably the upper end portion of said pin 77 is of helical spring form as indicated at 78 so that said pin is brought into action gradually rather than abruptly.

Referring to Figs. 8 and 9 of the drawings, it will be observed that the construction therein illustrated differs from the Fig. 2 construction primarily in that the metering pin 47 is not anchored to the plunger 64a, but is yieldably mounted with respect thereto. In other words, the plunger 64a is provided with a bottom abutment 79, the metering pin 47a is provided with a top abutment 80, and the spring 70a is interposed between said abutments. As a result the metering pin 47a obviously is permitted to move longitudinally relative to the plunger 64a. Accordingly, should the pressure developed in the chamber a during the "rebound above normal" phase of operation of the shock absorber become such as to accelerate downward movement of the plunger 64a to an extent such as to momentarily cause the groove 74a to become choked with liquid and thus halt the downward movement of said plunger, downward movement of the metering pin 47a may continue with the result of increasing the effective area of the port 46a and affording the equivalent of a blow-off. In fact, there is afforded the effect of a variable blow-off since the plunger 64a may again resume its downward movement when choking of the groove 74a has ceased and since the stated action may be repeated at any subsequent time during downward movement of the plunger and the metering pin.

Upon occurrence of the "rebound below normal" phase of operation, as when a vehicle wheel drops into a hole in a roadway, the metering pin 47a is movable downwardly resisted only by the spring 70a and thus the port 46a may readily open to permit dumping of liquid from the chamber a into the chamber b and consequent free dropping of the vehicle wheel into the hole.

In short, the Figs. 8 and 9 construction accomplishes the two very desirable functions of affording a constant resistance to unloading movement of the metering pin 47a during "rebound below normal" phases of operation of the shock absorber, and a varying or pop-off resistance to said metering pin during "rebound above normal" phases of operations of the shock absorber.

In other respects, the Figs. 8 and 9 construction and mode of operation are generally the same as the Fig. 2 construction. However, instead of the valve body 38a being held positioned in the piston 11a by engagement of the top of the valve seat ring 39a with the lugs 40a of said valve body, said valve body is held positioned by the seat 45a of said valve seat ring operating through the check valve 44a to engage beneath a flange 81 of said valve body. The under face of said flange 81 is of convex contour to permit the check valve 44a to open.

Referring to Fig. 10 of the drawings, it will be observed that the construction therein illustrated is generally the same as the Fig. 2 construction, except that the valve body 38b is screwed into the piston 11b and the check valve 44b is in the form of a flange extending laterally outward from a cuplike member 82 which is slidably mounted on the lower end portion of said valve body and which has in its lower end portion the chamber 47b and the port 46b with which the head 49b of the metering pin 47b cooperates. A coil spring 83 between the check valve flange 44b and the bottom of the valve body 38b urges said check valve flange normally to its seat. When said check valve 44b is seated, the cup-like member 82 is, of course, disposed in its lowermost or operative position. In other respects the Fig. 10 construction is generally the same and operates in generally the same manner as the Fig. 2 construction.

From the foregoing description considered in connection with the accompanying drawings, it is believed the improvements embodied in the present shock absorber will be clearly understood and their advantages appreciated. It is desired to point out, however, that while only certain specific structures have been illustrated and described, the improvements are capable of embodiment in specifically different structures within the spirit and scope of the invention as defined in the appended claims.

I claim:

1. In a hydraulic shock absorber, a cylinder, a piston reciprocable therein, a liquid reservoir, a head closing one end of said cylinder and having therein a port affording communication between said end of said cylinder and said reservoir, a check valve controlling said port and having therein an orifice affording communication between said end of said cylinder and said reservoir, a metering pin extending through said orifice and inwardly movable to close and outwardly movable to open the same, yieldable means tending constantly to move said metering pin inwardly to close said orifice, the inner end of said pin being exposed within the cylinder for subjection to liquid pressure to urge said pin outwardly and thus open said orifice, said head having a well and said pin having a piston portion disposed in said well to provide a dash-pot to resist outward movement of said pin, and means including a yieldably closed valve openable by the pressure of the liquid in said end of said cylinder to admit a portion of the liquid to said well outwardly of the piston portion of said pin to urge said pin inwardly.

2. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said head having a well and said pin having a piston portion disposed in said well to provide a dash-pot to resist outward movement of said pin, means including a yieldably closed valve openable by the pressure of the liquid to admit a portion of the liquid to said well outwardly of the piston portion of said pin to urge said pin inwardly, and mechanical means operable by said piston during the latter portion of the compression above normal phase of operation of the shock absorber to positively open said valve.

3. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said head having a well and said pin having a piston portion disposed in said well to provide a dashpot to resist outward movement of said pin, means including a yieldably closed valve openable by the pressure of the liquid to admit a portion of the liquid to said well outwardly of the piston portion of said pin to urge said pin inwardly, and a valve actuating pin engaged with said valve and extending into said end of said cylinder for engagement by said piston during the latter portion of the compression above normal phase of operation of the shock absorber to positively open said valve.

4. A shock absorber as set forth in claim 3 in which the inner end portion of the valve actuating pin is in the form of a helical spring.

5. A hydraulic shock absorber as set forth in claim 1 in which the metering pin is provided with an axial bore and the yieldably closed valve is in the form of a pin disposed in said bore and having its inner end portion inwardly tapered for outward movement beyond the outer end of said metering pin to progressively open the bore of said metering pin for flow of liquid therethrough from the cylinder to the well in which said metering pin is disposed.

NEVIN S. FOCHT.

REFERENCES CITED

The following references are of record in the file of this patent:

UNITED STATES PATENTS

| Number | Name | Date |
| --- | --- | --- |
| 2,111,192 | Padgett | Mar. 15, 1938 |
| 2,409,349 | Focht | Oct. 15, 1946 |